(12) United States Patent
Padhye et al.

(10) Patent No.: US 12,411,752 B2
(45) Date of Patent: Sep. 9, 2025

(54) GENERATIVE AI-ASSISTED CONFIGURATION OF APPLICATION ANALYTICS FEATURES

(71) Applicant: Cisco Technology, Inc., San Jose, CA (US)

(72) Inventors: Jaideep Padhye, San Jose, CA (US); Chandrasekhar Atina, Sunnyvale, CA (US); Najuka Prakash Sankhe, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 99 days.

(21) Appl. No.: 18/531,117

(22) Filed: Dec. 6, 2023

(65) Prior Publication Data

US 2025/0190325 A1 Jun. 12, 2025

(51) Int. Cl.
*G06F 11/34* (2006.01)
*G06F 9/46* (2006.01)

(52) U.S. Cl.
CPC .......... *G06F 11/3476* (2013.01); *G06F 9/466* (2013.01)

(58) Field of Classification Search
CPC ....... G06F 11/34; G06F 11/3476; G06F 9/466
See application file for complete search history.

(56) References Cited

U.S. PATENT DOCUMENTS

| | | | |
|---|---|---|---|
| 12,106,318 B1* | 10/2024 | Chiang | G06Q 30/016 |
| 2004/0139028 A1* | 7/2004 | Fishman | G06Q 20/40145 |
| | | | 713/172 |
| 2013/0151453 A1 | 6/2013 | Bhanot et al. | |
| 2021/0142219 A1 | 5/2021 | Adjaoute | |
| 2021/0209159 A1 | 7/2021 | Mahanta et al. | |
| 2023/0004562 A1 | 1/2023 | Chaudhuri et al. | |
| 2023/0108454 A1* | 4/2023 | Gidwaney | G16H 10/60 |
| | | | 705/4 |
| 2023/0316313 A1 | 10/2023 | Shah | |
| 2024/0354792 A1* | 10/2024 | Chiang | G06Q 30/0204 |
| 2024/0378389 A1* | 11/2024 | Rose | G06F 40/30 |
| 2024/0402661 A1* | 12/2024 | Challa | G05B 13/027 |
| 2025/0086187 A1* | 3/2025 | Fayyaz | G06F 16/24564 |
| 2025/0117727 A1* | 4/2025 | Osborne | G06Q 10/06316 |
| 2025/0130998 A1* | 4/2025 | Sachinkumar | G06F 16/24545 |

OTHER PUBLICATIONS

Burman V., et al., "How Generative AI Correlates IT and Business Objectives to Maximize Business Outcomes", IBM, Aug. 14, 2023, 11 Pages.

* cited by examiner

*Primary Examiner* — Kamini B Patel
(74) *Attorney, Agent, or Firm* — Lee & Hayes, P.C.; James M. Behmke

(57) ABSTRACT

In one embodiment, a device generates a prompt for a large language model that returns a set of transactional milestones for a particular type of transactional workflow in an application, based on input from a user interface that indicates the particular type of transactional workflow. The device identifies a set of monitored transactions in the application that match any of the set of transactional milestones and aggregates telemetry data for the set of monitored transactions into a transactional workflow of the particular type. The device also provides information regarding the transactional workflow for display by the user interface.

20 Claims, 7 Drawing Sheets

GENERATIVE AI-ASSISTED CONFIGURATION OF APPLICATION ANALYTICS FEATURES

TECHNICAL FIELD

The present disclosure relates generally to computer networks, and, more particularly, to generative artificial intelligence (AI)-assisted configuration of application analytics features.

BACKGROUND

Online applications are becoming increasingly complex systems that comprise many services (e.g., micro-services) hosted across a wide variety of locations. For instance, consider the case of a retail application whereby a user first logs into their account, then browses for products, adds a selected product to their cart, enters payment information, confirms their order, and then checks out, to complete the purchase. Underlying each of these transactional milestones from the standpoint of a user may be the various services associated with the retail application. For example, the user logging into their account may entail their mobile app connecting to an identity service, the checkout may entail sending their credit card information to a financial service for approval, etc.

These transactional milestones, as well as other metrics regarding the performance of the application, can be of great interest to the entity operating the application. However, there are many challenges to configuring application analytics features because such features often require personnel with different sets of expertise to configure them correctly. For example, one such expert may have knowledge about the different transactional workflows and which ones are important to monitor. A DevOps expert may also be needed to configure the analytics tools correctly, based on their knowledge of the deployment. Finally, an expert developer may also need to be involved, to instrument the code with relevant attributes that can be leveraged for application analytics.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device generates a prompt for a large language model that returns a set of transactional milestones for a particular type of transactional workflow in an application, based on input from a user interface that indicates the particular type of transactional workflow. The device identifies a set of monitored transactions in the application that match any of the set of transactional milestones and aggregates telemetry data for the set of monitored transactions into a transactional workflow of the particular type. The device also provides information regarding the transactional workflow for display by the user interface.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
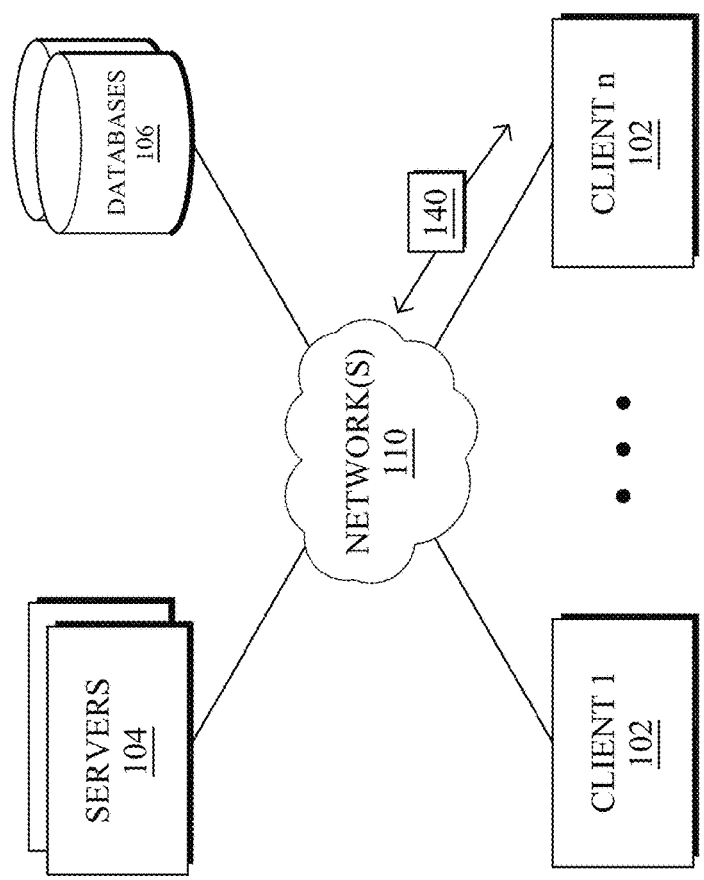
FIG. 1 illustrates an example computer network.

FIG. 1 is a schematic block diagram of an example simplified computing system (e.g., the computing system 100), which includes client devices 102 (e.g., a first through nth client device), one or more servers 104, and databases 106 (e.g., one or more databases), where the devices may be in communication with one another via any number of networks (e.g., network(s) 110). The network(s) 110 may include, as would be appreciated, any number of specialized networking devices such as routers, switches, access points, etc., interconnected via wired and/or wireless connections. For example, client devices 102, the one or more servers 104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, the one or more servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
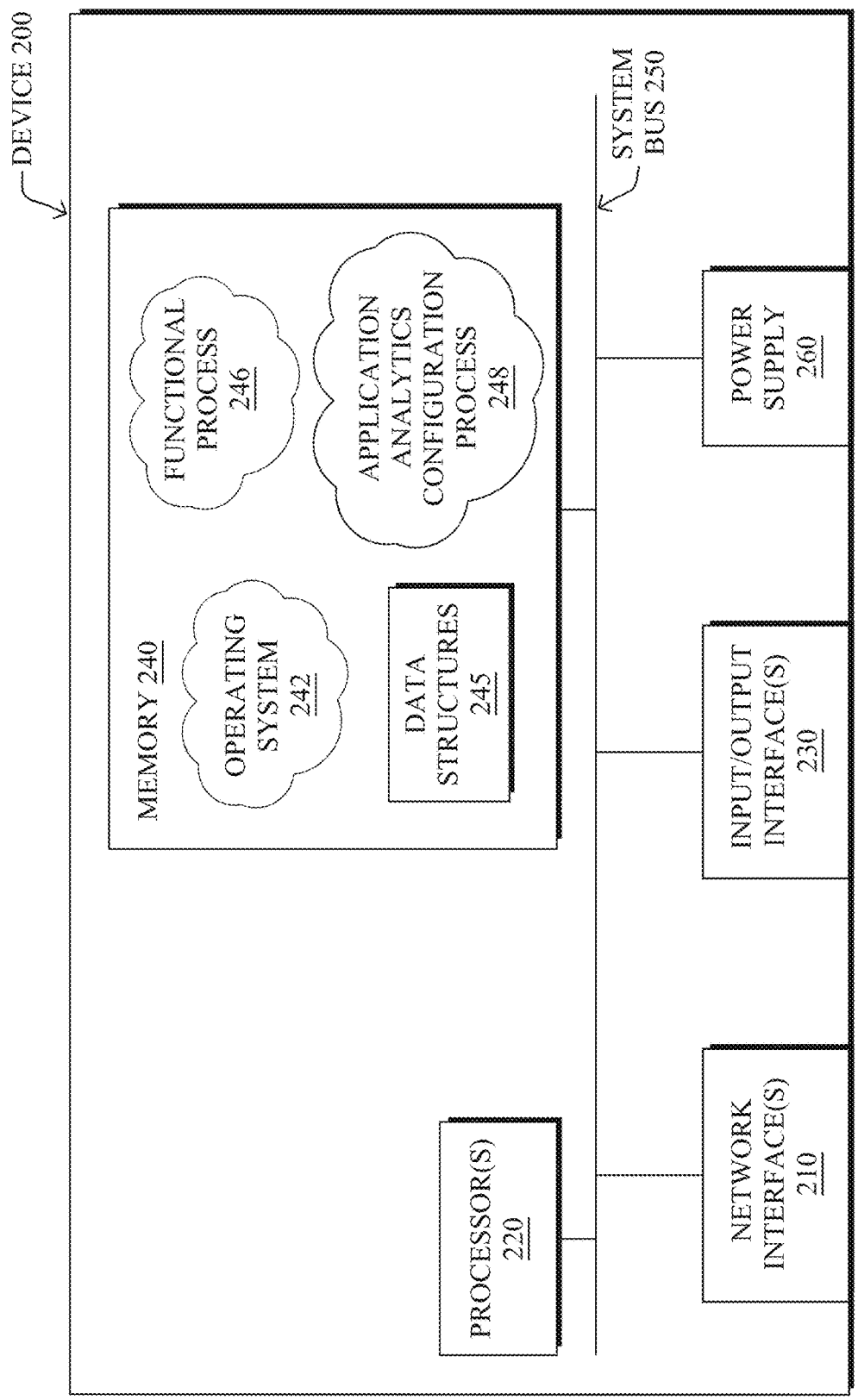
FIG. 2 illustrates an example computing device/node.

FIG. 2 is a schematic block diagram of an example node/device 200 (e.g., an apparatus) that may be used with one or more embodiments described herein, e.g., as any of the devices shown in FIG. 1 above. Device 200 may comprise one or more network interfaces, such as interfaces 210 (e.g., wired, wireless, network interfaces, etc.), at least one processor (e.g., processor 220), and a memory 240 interconnected by a system bus 250, as well as a power supply 260 (e.g., battery, plug-in, etc.).

The interfaces 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes (e.g., functional processes 246), and on certain devices, an illustrative application analytics configuration process 248, as described herein. Notably, functional processes 246, when executed by processor 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various implementations, as detailed further below, application analytics configuration process 248 may include computer executable instructions that, when executed by processor(s) 220, cause device 200 to perform the techniques described herein. To do so, in some implementations, application analytics configuration process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, application analytics configuration process 248 may employ one or more supervised, unsupervised, or semi-supervised machine learning models. Generally, supervised learning entails the use of a training set of data that is used to train the model to apply labels to the input data. For example, the training data may include sample configurations labeled with textual metadata. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that application analytics configuration process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, application analytics configuration process 248 may also include, or otherwise use, one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of configuring an observability platform to perform certain application analytics, application analytics configuration process 248 may use a generative model to generate configurations based on a conversational input from a user (e.g., voice, text, etc.). Example generative approaches can include, but are not limited to, generative adversarial networks (GANs), large language models (LLMs), other transformer models, and the like.

Observability Intelligence Platform

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable demand. Thus, using cloud-based/web-based services can allow an enterprise to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular transaction (or a particular type of transaction) is being effected, and so on, whether for individual devices, a category of devices (e.g., type, location, capabilities, etc.), or any other suitable embodiment of categorical classification.

Figure 3:
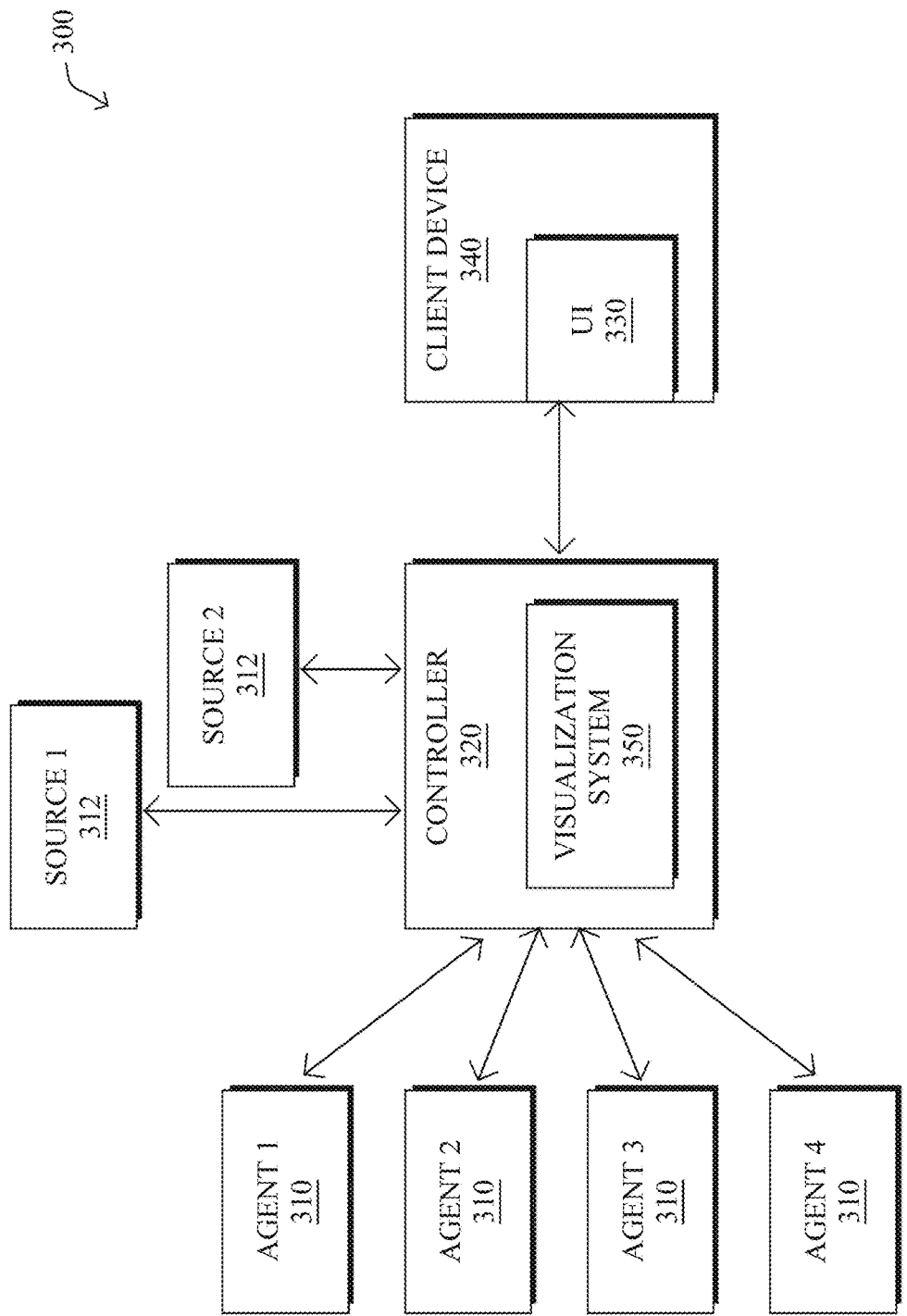
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents (e.g., agents 310), one or more sources (e.g., sources 312), and one or more servers/controllers (e.g., controller 320). Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a user interface 330 (denoted UI in FIG. 3), such as a browser-based UI, that is the primary interface for monitoring, analyzing, and troubleshooting the monitored environment. Specifically, the controller 320 can receive data from agents 310, sources 312 (and/or other coordinator devices), associate portions of data (e.g., topology, transaction end-to-end paths and/or metrics, etc.), communicate with agents to configure collection of the data (e.g., the instrumentation/tests to execute), and provide performance data and reporting through user interface 330. User interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, a controller 320 may be installed locally and self-administered.

The controllers 320 receive data from the agents 310 (e.g., Agents 1-4) and/or sources 312 deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application. Further, the controllers 320 can receive data from sources 312 (e.g., sources 1-2). Any of the sources can be implemented to provide various types of observability data that can include information, metrics, telemetry data, business data, network data, etc.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

An application transaction, in particular, is a representation of the particular service provided by the monitored environment that provides a view on performance data in the context of the various tiers that participate in processing a particular request. That is, an application transaction, which may be identified by a unique application transaction identification (ID), represents the end-to-end processing path used to fulfill a service request in the monitored environment (e.g., adding items to a shopping cart, storing information in a database, purchasing an item online, etc.). Thus, an application transaction is a type of user-initiated action in the monitored environment defined by an entry point and a processing path across application servers, databases, and potentially many other infrastructure components. Each instance of an application transaction is an execution of that transaction in response to a particular user request (e.g., a socket call, illustratively associated with the TCP layer). An application transaction can be created by detecting incoming requests at an entry point and tracking the activity associated with request at the originating tier and across distributed components in the application environment (e.g., associating the application transaction with a 4-tuple of a source IP address, source port, destination IP address, and destination port). A flow map can be generated for an application transaction that shows the touch points for the application transaction in the application environment. In one embodiment, a specific tag may be added to packets by application specific agents for identifying application transactions (e.g., a custom header field attached to a hypertext transfer protocol (HTTP) payload by an application agent, or by a network agent when an application makes a remote socket call), such that packets can be examined by network agents to identify the application transaction identifier (ID) (e.g., a Globally Unique Identifier (GUID) or Universally Unique Identifier (UUID)). Performance monitoring can be oriented by application transaction to focus on the performance of the services in the application environment from the perspective of end users. Performance monitoring based on application transactions can provide information on whether a service is available (e.g., users can log in, check out, or view their data), response times for users, and the cause of problems when the problems occur.

In accordance with certain embodiments, both self-learned baselines and configurable thresholds may be used to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or application transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

As noted above, though, there are many challenges to configuring application analytics features because such features often require personnel with different sets of expertise to configure them correctly. For example, one such expert may have knowledge about the different transactional workflows and which ones are important to monitor. A DevOps expert may also be needed to configure the analytics tools correctly, based on their knowledge of the deployment. Finally, an expert developer may also need to be involved, to instrument the code with relevant attributes that can be leveraged for analytics. In other words, it is often challenging to configure an observability platform to perform application analytics for specific transactional workflows and transactions within the application, as doing so requires both knowledge of the workflows themselves, as well as the technical details of both the observability platform, as well as the application itself.

—Generative AI-Assisted Configuration of Application Analytics Features—

The techniques herein provide for the use of generative AI, to allow even a layperson to configure application analytics features, such as to monitor certain transactional workflows available to users within an application. In some aspects, the techniques herein may translate a stated goal or request from the user (in conversational form) into a prompt for an LLM or other generative AI model, which generates a schema for a transactional workflow indicated by the input and allowing for the automated configuration of monitoring for that workflow.

Further aspects herein also provide for the configuration of transactional "funnels," which may be viewed as akin to transactional workflows where the steps/milestones are optional and users may opt not to complete the workflow at any given milestone. For instance, in the case of making an online purchase, a user may search for a certain item, add it to their cart, and then decide to end their session, rather than completing their purchase.

These processes can, as described in more detail herein, be based on an input received by a user interface that indicates particular types of workflows of interest, particular types of transactional milestones of interest, particular types of outputs of interest, and so on and so forth. For instance, embodiments described herein allow a layperson persona (e.g., a layperson who may have limited understanding of computers, computing languages, coding, methodologies to define transactional milestones/transactional workflows to a computer, etc.) to provide an input to a user interface that indicates particular types of workflows of interest, particular types of transactional milestones of interest, particular types of outputs of interest, etc. and receive useful and valuable information regarding workflows of interest and/or transactional milestones of interest, particularly as presented as transactional workflows and/or transaction funnels. In addition, such transactional workflows and/or transaction funnels can be presented back the layperson persona via the user interface to allow this type of user to easily visualize and digest the information requested.

Specifically, according to various embodiments, a device generates a prompt for a large language model that returns a set of transactional milestones for a particular type of transactional workflow in an application, based on input from a user interface that indicates the particular type of transactional workflow. The device identifies a set of monitored transactions in the application that match any of the set of transactional milestones and aggregates telemetry data for the set of monitored transactions into a transactional workflow of the particular type. The device also provides information regarding the transactional workflow for display by the user interface.

Illustratively, the techniques described herein may be performed by hardware, software, and/or firmware, such as in accordance with application analytics configuration process 248, which may include computer executable instructions executed by the processor 220 (or independent processor of interfaces 210) to perform functions relating to the techniques described herein.

Figure 4:
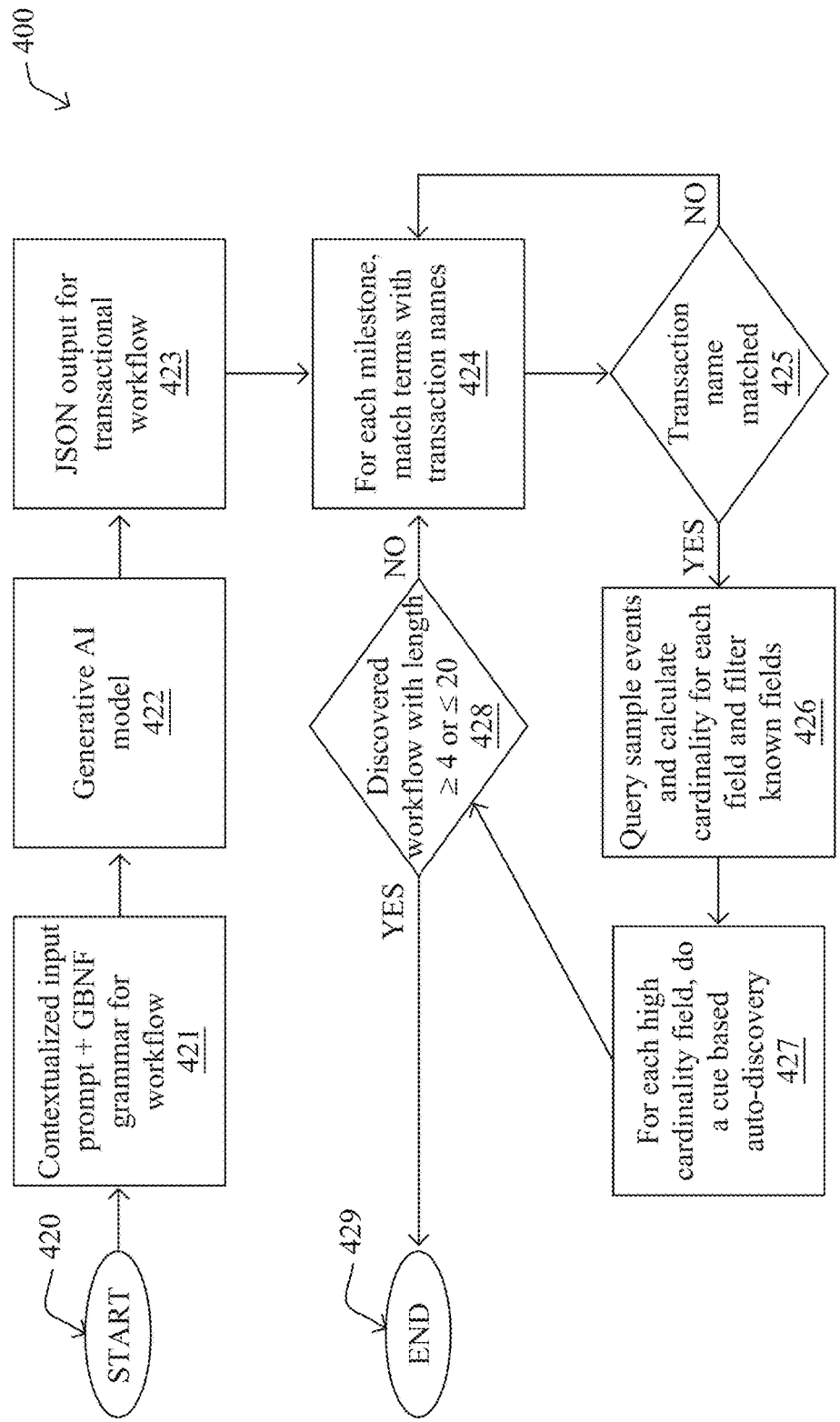
FIG. 4 illustrates an example flow for generative artificial intelligence (AI)-assisted configuration of application analytics features in accordance with embodiments of the disclosure.

Operationally, FIG. 4 illustrates an example flow for generative AI-assisted configuration of application analytics features in accordance with embodiments of the disclosure. The discussion of FIG. 4 is accompanied by an illustrative, non-limiting example that is provided to elucidate aspects of the disclosure. As shown, application analytics configuration process 248 may perform (or cause performance of) any or all of the steps shown in flow 400. As shown, flow 400 may start at operation 420 with the receipt of a prompt (e.g., an input prompt) from a user. The prompt received at operation 420 can be a natural language prompt (e.g., a natural language input prompt) in any suitable format, such as text, voice, or the like. The prompt can be received via a user interface, such as the user interface 330 of FIG. 3. In the non-limiting example described in connection with FIG. 4, a prompt received at operation 420 can be something simple such as: "e-commerce product process workflow."

At operation 421, the prompt received at operation 420 is contextualized to generate a contextualized prompt (e.g., a contextualized input prompt). In some embodiments, the contextualized prompt is generated automatically (e.g., in the absence of a further user command) in response to the prompt at operation 420. Continuing with the non-limiting example, the natural language prompt "e-commerce product process workflow" can be contextualized to generate a contextualized prompt that reads, for example:

"Sample AppDynamics transactional workflow for e-commerce product purchase workflow. The milestone name should be short and easily readable. The endpoint names should be one word with no spaces for example, authenticate. The ListOfAlternateEndpointNames should include up to five synonyms for the endpoint name, for example, login, signin, etc. The output should be in valid JSON format with the following schema." [With an associated example schema.]

In some embodiments, at operation 421, formal grammar parameters can be generated and/or added to the contextualized prompt, particularly for a transactional workflow. The formal grammars can be used to constrain outputs of a model, such as an AI model. For example, the formal grammars can be used to constrain the output of a model such that the output is presented in the JSON format (as in the non-limiting example of FIG. 4), or other suitable format. In some embodiments, the formal grammars can be GBNF grammar (e.g., GGML BNF, a library as will be understood by those skilled in the art) as shown in FIG. 4, although embodiments are not limited to these particular grammars.

At operation 423, an output can be generated as a result of processing by the generative AI model at operation 422. The output can be in the JavaScript Object Notation (JSON) format (although embodiments are not so limited) and may correspond to a transactional workflow, a transaction funnel, set of transactional milestones, or other application analytics feature. Continuing with the non-limiting example above, an output given the contextualized prompt of operation 421 may be something such as:

```
{
  "TransactionalWorkflowDescription": "A user purchases a product on an e-
commerce website",
  "TransactionalWorkflowName": "ProductPurchase",
  "ListOfMilestones": [
    {
      "HttpEndpointName": "authenticate",
      "ListOfAlternateEndpointNames": [
        "login",
        "signup",
        "register"
      ],
      "MilestoneDescription": "The user is redirected to the authentication page after
adding the product to cart.",
      "MilestoneName": "Authenticated"
    },
    {
      "HttpEndpointName": "addCardDetails",
      "ListOfAlternateEndpointNames": [
        "enterCardInfo",
        "providePaymentMethod"
      ],
      "MilestoneDescription": "The user enters their payment details to complete the
purchase.",
      "MilestoneName": "AddCardDetails"
    },
    {
      "HttpEndpointName": "placeOrder",
      "ListOfAlternateEndpointNames": [
        "submitOrder",
        "completeOrder"
      ],
      "MilestoneDescription": "The user places the order and completes the
purchase.",
      "MilestoneName": "PlaceOrder"
    }
  ]
}
```

At operation 424, application analytics configuration process 248 attempts to match the milestone fields (e.g., generated transactional milestones) of the response and each of the suggested endpoint names with a transaction (e.g., an actual transactional milestone) in a database. In some embodiments, application analytics configuration process 248 may perform the matching using fuzzy matching algorithms such as a Levenstein distance algorithm, a cosine matching algorithm (e.g., a Bigram Cosine Similarity algorithm, a Jaro-Winkler distance algorithm, etc.) or any other suitable matching approach.

The database can be a transaction database that is configured to store information corresponding to various application transactions associated with various services associated with a retail application and/or corresponding transactional milestones associated with a transactional workflow, a transaction funnel (as shown below), or other application analytics feature.

At operation 425, application analytics configuration process 248 may make a determination as to whether the milestone fields (e.g., generated transactional milestones) of the response and the suggested endpoint names matches with a transaction (e.g., an actual transactional milestone) in the database. At operation 426, for each transaction that matches the milestone fields of the response from operation 423 and the suggested endpoint names, application analytics configuration process 248 may take a sample of events from the database and calculate the fields that have the highest cardinality (i.e., those with a large number of distinct/non-repeated values).

Next, at operation 427, for each of the high cardinality fields, application analytics configuration process 248 may perform a cue-based auto-discovery to auto-discover the transactional workflow or other application analytics feature. The auto-discovery process can be a "brute-force" auto-discovery process where a user specifies a start time of events to be considered and an end time of events to be considered, and the auto-discovery of transactional milestone sequences process is initiated or other auto-discovery process which includes auto-discovery of loops, forks, and/or joins in the transactional milestone sequence.

Subsequent to performance of the auto-discovery process, at operation 428 a transactional workflow (e.g., a transactional workflow) is thus discovered by application analytics configuration process 248. As discussed above, the transactional workflow may include a set of transactional milestones for a particular type of transactional workflow associated with an application (e.g., an online application). As shown in FIG. 4, constraints, such as a length may be applied to the transactional workflow to ensure that the transactional workflow is neither too exclusive nor too inclusive. For example, in FIG. 4, the transactional workflow is constrained such that the length is greater than or equal to four but less than or equal to twenty. Other lengths may be configured in accordance with the disclosure and, accordingly, embodiments are not limited to this particular enumerated transactional workflow length.

Application analytics configuration process 248 may then return the transactional workflow, which may include a set of transactional milestones to a user interface, such as the user interface 330 of FIG. 3. This can allow a user, such as a layperson, to easily visualize the transactional workflow, transactional milestones, and/or transactional workflow generated by the operations described herein. In turn, the user may opt to automatically configure the observability platform to monitor that transactional workflow and its constituent milestones. Alternatively, the system may configure such monitoring, automatically.

At operation 429, the flow 400 may end.

Figure 5:
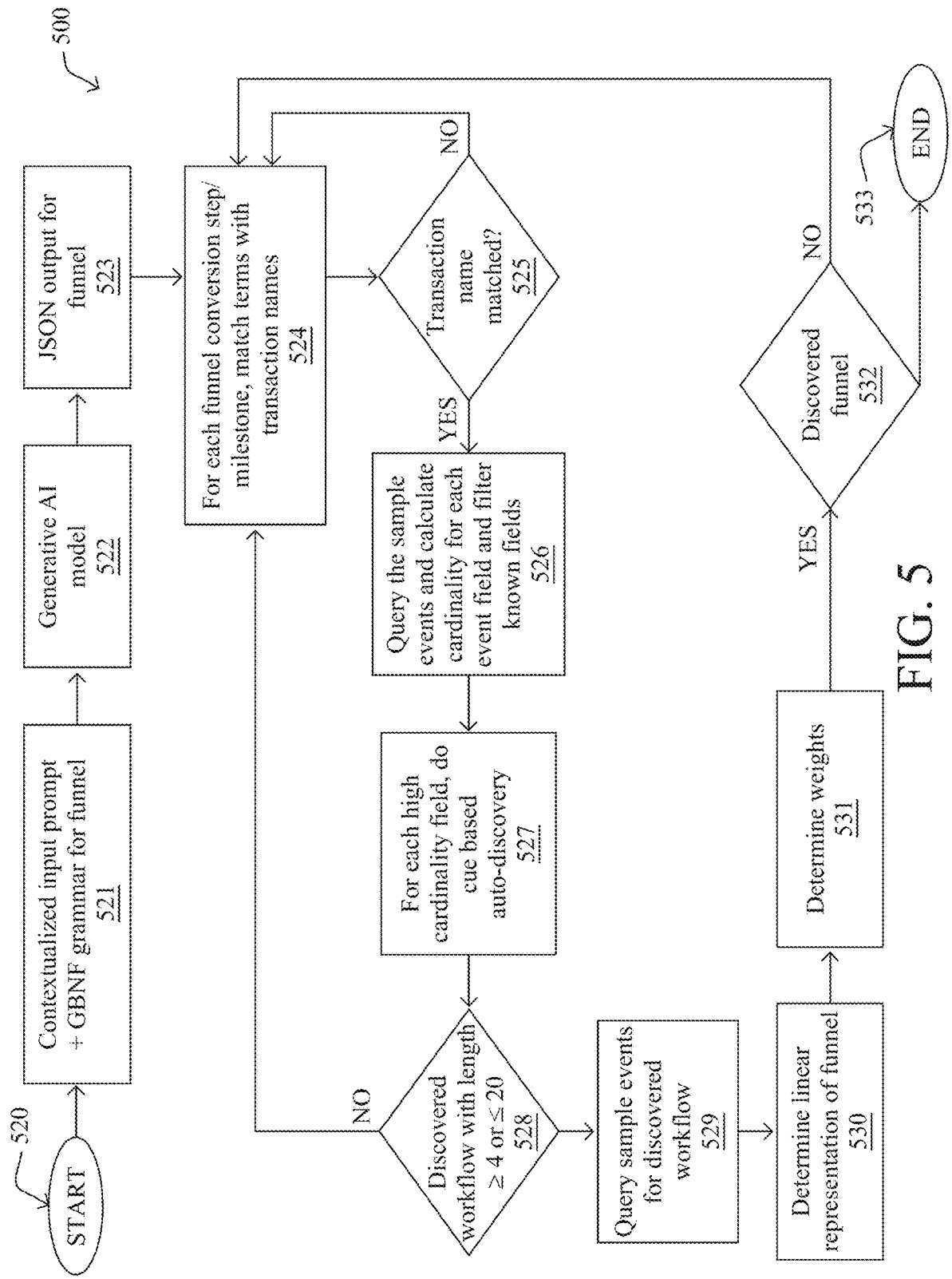
FIG. 5 illustrates another example flow for generative AI-assisted configuration of application analytics features in accordance with embodiments of the disclosure.

Operationally, FIG. 5 illustrates another example flow for generative AI-assisted configuration of application analytics features in accordance with embodiments of the disclosure. The main difference between the flow 500 of FIG. 5 and the flow 400 of FIG. 4 is that in FIG. 5, a transaction funnel is ultimately auto-discovered while in FIG. 4, a transactional workflow is ultimately auto-discovered. As with flow 400, flow 500 may be implemented by application analytics configuration process 248.

For instance, as shown in the flow 500, application analytics configuration process 248 may start at operation 520 with the receipt of a prompt (e.g., an input prompt) from a user. The prompt received at operation 520 can be a natural language prompt (e.g., a natural language input prompt), such as that shown above in operation 420 (e.g., "e-commerce product process workflow"). At operation 521, the prompt received at operation 520 is contextualized to generate a contextualized prompt (e.g., a contextualized input prompt), here using formal grammar parameters specific for a transaction funnel. The contextualized prompt is then processed by a generative AI model at operation 522, similar to flow 400 in FIG. 4.

At operation 523, application analytics configuration process 248 may generate an output (e.g., a JSON output) for the funnel as a result of processing by the generative AI model at operation 522. Then, at operation 524, for each funnel conversion step, application analytics configuration process 248 may make an attempt to match the terms with application transaction names. At operation 525, if the transaction name is matched, then at operation 526, application analytics configuration process 248 may query the sample events and calculate cardinality for each event field and filter known fields. Then, at operation 527, for each high cardinality field, application analytics configuration process 248 may perform a cue-based, auto-discovery, to auto-discover the transaction funnel. Next, at operation 528 a user journey is thus discovered (e.g., with length constraints, similar to above).

Now, as shown in FIG. 5, at operation 529, sample events (e.g., the sample event of operation 526) can be queried to determine user discovered transactional workflows (e.g., a transactional workflow of a particular type). For example, because the flow 500 of FIG. 5 seeks to auto-discover transaction funnels, which can correspond to multiple transactional workflows experienced by many users, at operation 529, application analytics configuration process 248 may amalgamate multiple user transactional workflows for further process described below to generate a transaction funnel.

At operation 530, application analytics configuration process 248 may use any number of various algorithms (e.g., Markov chain algorithms, etc.) and/or directed acyclic graph (DAG) on the results obtained from the sampled events at operation 529 to generate a linear representation of transaction funnel journeys. In some embodiments, application analytics configuration process 248 may also perform deduplication at operation 530 to remove duplicate sampled events from operation 529. Further, in some embodiments, application analytics configuration process 248 may also perform operation 530 to ensure that prior stages of the transaction funnel are completed before a next transaction funnel stage is processed.

In some embodiments, application analytics configuration process 248 may also order each individual user transactional workflow (e.g., according to timestamp, etc.) and perform deduplication to eliminate duplicate user transactional workflows. In addition, application analytics configuration process 248 may construct the DAG based on the number of user transactional workflows (after deduplication). As discussed herein, the DAG can be used to discover (e.g., to auto-discover) transaction funnels and/or alternate transaction funnels. It will be appreciated that drop-offs, which are a critical behavior in the transaction funnel(s), may also be considered during the discovery (e.g., auto-discovery) process of FIG. 5.

At operation 531, application analytics configuration process 248 may leverage any number of various algorithms (e.g., Dijkstra's algorithm, etc.) to determine a most frequently used path in the DAG (e.g., the directed acyclic graph 600 of FIG. 6A, described below). In addition, at operation 531, application analytics configuration process 248 may assign weights to the most frequently used edges of the DAG based on the frequencies of traversal associated with these edges. The algorithm used can then be further modified to prioritize the paths of the DAG that exhibit higher frequencies of traversal over paths that exhibit lower frequencies of traversal.

In some embodiments, the DAG correlation with the transaction funnel (e.g., a transactional workflow corresponding to a particular type that is a transaction funnel) can be performed by, or assisted by, using the generative AI model from operation 522. For example, the generative AI model may suggest alternate paths that may not be supported by the frequencies of traversal, but which may also be of interest. These alternative paths may be considered when discovering the transaction funnel and/or may be presented as alternate transaction funnels.

At operation 532, a transaction funnel (or "transaction funnel journey") is thus discovered. The transaction funnel journey that is discovered can be analogous to the transaction funnel 601 of FIG. 6B, described below. In some embodiments, the transaction funnel can be a transactional workflow that includes multiple transactional workflows that correspond to multiple transactional workflows.

Application analytics configuration process 248 may then return the transaction funnel, which may include a set of transactional milestones for a particular type of transactional workflow in an application, for presentation by a user interface, such as the user interface 330 of FIG. 3. This can allow a user, such as a layperson, to easily visualize the transactional workflow, transactional milestones, and/or transactional workflow generated by the operations described herein. In further implementations, the system may also configure the observability platform to monitor the funnel (and its m At operation 533, the flow 500 may end.

Figure 6:
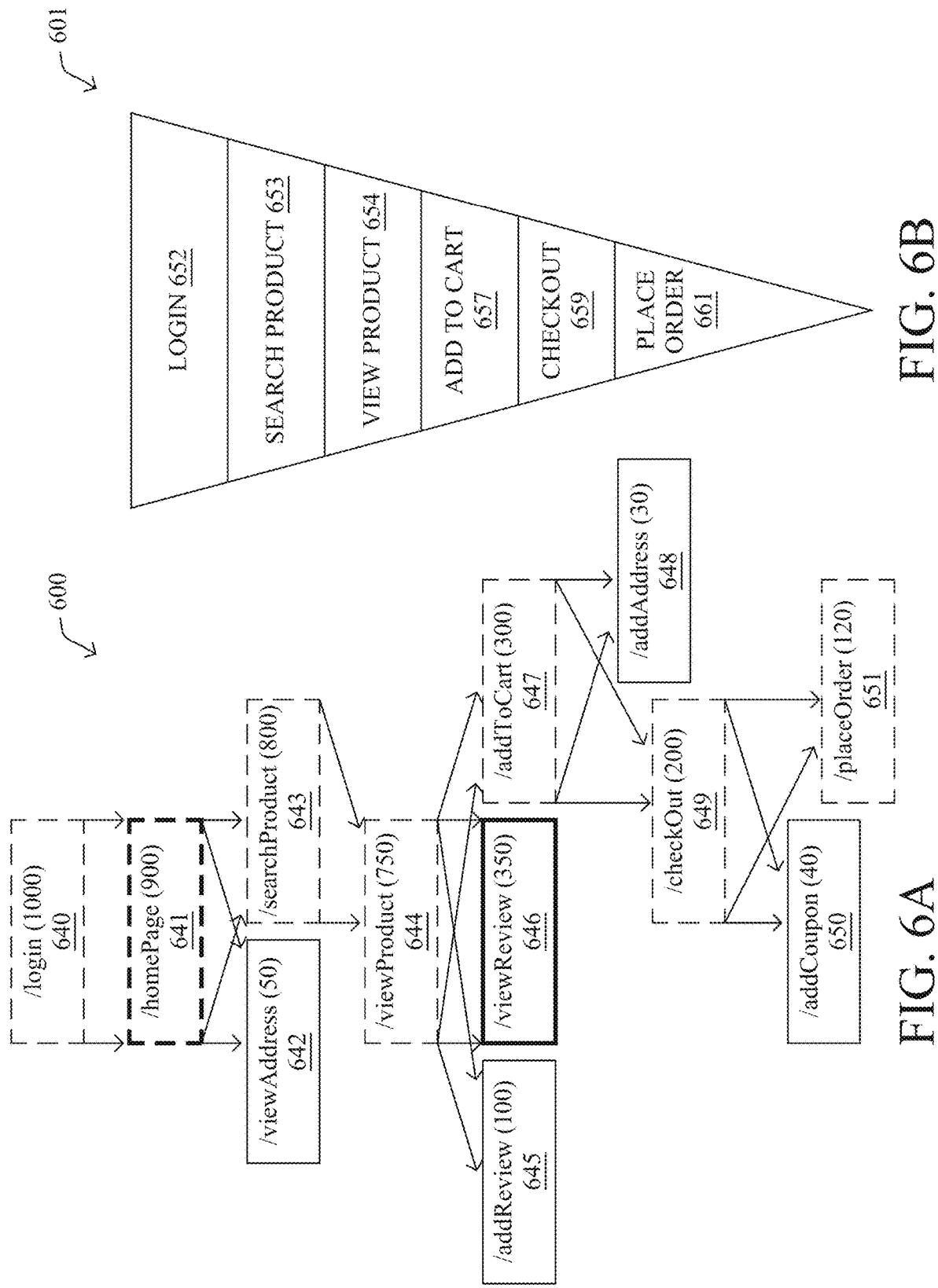
FIG. 6A illustrates an example directed acyclic graph, in accordance with one or more embodiments described herein.
FIG. 6B illustrates an example transaction funnel for an application, in accordance with one or more embodiments described herein.

As noted, FIG. 6A illustrates an example directed acyclic graph 600 in accordance with one or more embodiments described herein. The directed acyclic graph 600 can be analogous to the DAG discussed above in connection with FIG. 5 and, accordingly, can be utilized in connection with operation 529, operation 530, operation 531, and/or operation 532 that are discussed in connection with FIG. 5. As shown in FIG. 6A, each of the blocks has a frequency associated therewith (indicated by the Arabic numerals in parentheses inside each of the boxes). The frequency can correspond to a likelihood that the user navigates to a portion of the application associated with the text in each of the boxes. For example, the number (1000) in one of the boxes can indicate that one hundred percent of users (e.g., 1000 users) access that portion of the application, while the number (750) can indicate that seventy-five percent of users (750 out of 1000) access that portion of the application.

Further, as shown in FIG. 6A, several of the boxes are denoted by interior hash marks. These marks can correspond to weights associated with edges of the directed acyclic graph 600 that correspond to frequencies at which either (1) paths observed in the user transactional workflows discussed above or (2) paths suggested by the generative AI techniques described here. These marks will be described in further detail in connection with the boxes that include the same, below.

As shown in FIG. 6A, the directed acyclic graph 600 includes a box (e.g., a node) corresponding to a login 640. The login 640 can correspond to a user logging into an application (e.g., an online application). As shown in FIG. 6A, subsequent to the login 640, the user is taken to a home page 641 for the application. From the home page 641, the user may choose to navigate to a portion 642 of the application where they may enter a new address or a search product portion 643 of the application where they may search for products. As shown in FIG. 6A, there is a much high frequency that a user navigates to the search product portion 643 of the application than to the new address portion 642 of the application.

Once the user has navigated to the search product portion 643 of the application, the user may next navigate to a view product portion 644 of the application. From this portion of the application, the user may navigate to several different other portions of the application. For example, the user may choose to write a product review of the product they viewed in the view product portion 644 of the application and may navigate to the add review portion 645 of the application. The user may also decide to view reviews of the product written by others and may instead navigate to the view review portion 646 of the application. The user may also forgo these options and decide to add the product to their online shopping cart and navigate to the add to cart portion 647 of the application.

It is noted that, in FIG. 6A, the frequency at which the user navigates to the view review portion 646 of the application is higher (as determined by the algorithms discussed in connection with operation 531 discussed in connection with FIG. 5); however, using the generative AI techniques described herein, the add to cart portion 647 of the application may be added to the transaction funnel (or an alternative funnel), as shown in FIG. 6B.

Once the user has navigated to the add to cart portion 647 of the application, the user may then add an address (e.g., add a (new or alternate) shipping address for the product) and, accordingly, navigate to an add address portion 648 of the application. In the alternative, the user may choose to navigate to a checkout portion 649 of the application in preparation for purchasing the product.

After the user has decided to checkout and has navigated to the checkout portion 649 of the application, the user may add a coupon, which causes the user to be navigated to an add coupon portion 650 of the application, or the user may place their order and navigate to a place order portion 651 of the application.

In some embodiments, the steps described in connection with FIG. 6A can, in conjunction with the operations described in connection with FIG. 5, be used to discover (e.g., auto-discover) a transaction funnel utilizing the techniques presented herein. An example of a transaction funnel that may be discovered (e.g., generated) in connection with the non-limiting examples provided above is discussed in connection with FIG. 6B.

FIG. 6B illustrates an example transaction funnel 601 in accordance with one or more embodiments described herein. As mentioned above, the transaction funnel can be generated in connection with the examples provided in connection with FIG. 5 and FIG. 6B, herein. Notably, as shown in FIG. 6B, the transaction funnel 601 includes information that, but for the generative AI techniques of the present disclosure, may include different information.

For example, based on the algorithms discussed above that may consider only the weight of edges associated with the directed acyclic graph 600, a transaction funnel 601 may include a view review event 656 as opposed to, for example, an add to cart event 657. Accordingly, by relying on algorithms that merely contemplate the weights of edges of a DAG, such as the directed acyclic graph 600 illustrated in FIG. 6A, events/milestones that may be more useful to the transaction funnel 601 may be ignored.

Stated alternatively, the techniques described herein allow for the use of generative AI to better resolve features that may be more important to be considered in a transaction funnel and, as a result, may prioritize inclusion of an event, such as an add to cart event 657 over inclusion of a view review event 656. This can allow for a more robust view of features and events that may be most important when analyzing application analytics features, e.g., it may be more beneficial to understand events that lead to a purchase (e.g., an add to cart event) than events that may not lead to purchases (e.g., a view review event).

The transaction funnel 601 includes first information corresponding to a login event 652. This login event 652 can be analogous to the login 640 of FIG. 6A. The transaction funnel 601 next includes a search product event 653, which can be analogous to the user navigating to the search product portion 643 of the application described in FIG. 6A. The transaction funnel 601 further includes a view product event 654, which can be analogous to the user navigating to the view product portion 644 of the application described in FIG. 6A.

Further, the transaction funnel 601 can include an add to cart event 657, which can be analogous to the user navigating to the add to cart portion 647 of the application described in FIG. 6A. The transaction funnel 601 can further include a checkout event 659, which can be analogous to the user navigating to the checkout portion 649 of the application described in FIG. 6A. Finally, the transaction funnel 601 can include a place order event 661, which can be analogous to the user navigating to the place order portion 651 of the application described in FIG. 6A.

Figure 7:
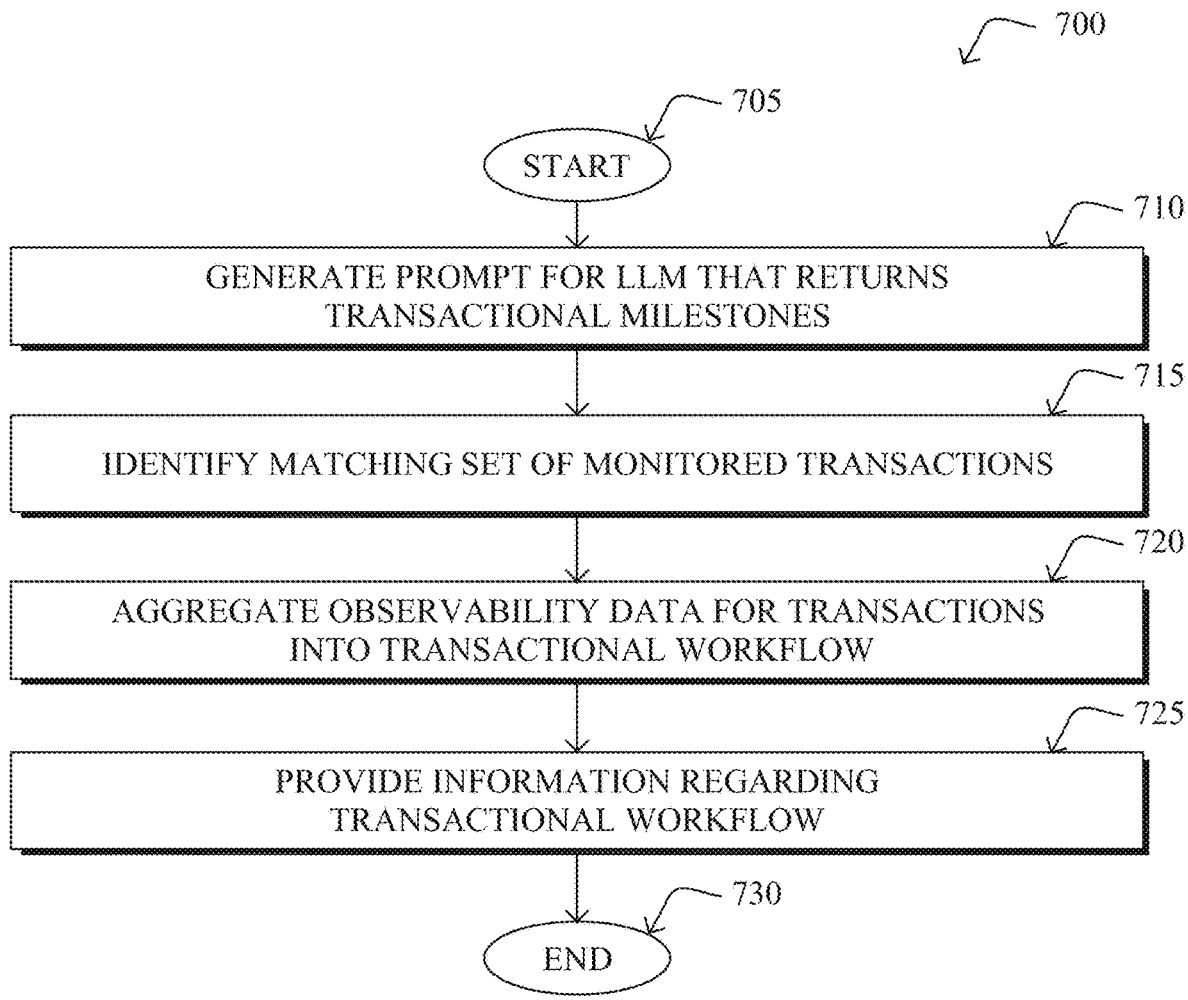
FIG. 7 illustrates an example simplified procedure for generative AI-assisted configuration of application analytics features in accordance with embodiments of the present disclosure.

FIG. 7 illustrates an example simplified procedure for generative AI-assisted configuration of application analytics features, in accordance with one or more embodiments described herein. For example, a non-generic, specifically configured device for auto-discovery of sequential, transactional milestones in application observability data (e.g., device 200), may perform procedure 700 (e.g., a method) by executing stored instructions (e.g., process 248). The procedure 700 may start at step 705, and continues to step 710, where, as described in greater detail above, the device (e.g., a controller, processor, etc.) may generate a prompt for a large language model (LLM) that returns a set of transactional milestones for a particular type of transactional workflow in an application, based on input from a user interface that indicates the particular type of transactional workflow. In some instances, the prompt indicates an output format for the set of transactional milestones. In one case, the input from the user interface comprises voice data, text data, and/or other forms of data input originated from the user. In some cases, the device may send the prompt to the LLM via an application programming interface.

At step 715, as detailed above, the device may identify a set of monitored transactions in the application that match any of the set of transactional milestones. In various implementations, the set of transactional milestones include hypertext transfer protocol endpoints of the application associated with those transactional milestones. In such cases, the device identifies the set of monitored transactions based on the hypertext transfer protocol endpoints of the application. In various implementations, the set of monitored transactions in the application are monitored via instrumentation inserted into the application.

Such endpoints are not limited to hypertext transfer protocol endpoints, however, and it will be appreciated that the term "endpoint" is intended to be inclusive of Remote Procedure Call endpoints (e.g., gRPC endpoints, etc.), log events, and/or other such endpoints.

At step 720, the device may aggregate observability data for the set of monitored transactions into a transactional workflow of the particular type. In some embodiments, the observability data may include metrics, events, logs, and traces (i.e., MELT data) or other telemetry data regarding the application.

At step 725, as detailed above, the device may provide information regarding the transactional workflow for display by the user interface. In some instances, the transactional workflow is a transaction funnel. In such cases, the information regarding the transactional workflow may indicate a count of users that performed each of the set of transactional milestones.

Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for generative AI-assisted configuration of application analytics features, such as transactional workflows. More specifically, by automatically generating configurations for application analytics features (e.g., transactional workflows, such as transactional workflows, business flows, etc.) based on a natural language input prompt, complex transactional workflows and/or transaction funnels can be generated without the need for multiple personnel to be involved, such as developers, DevOps, etc. This can allow customers to configure their own application analytics features thereby saving time and money in comparison to current approaches.

While there have been shown and described illustrative embodiments that provide for generative AI-assisted configuration of application analytics features, it is to be understood that various other adaptations and modifications may be made within the intent and scope of the embodiments herein. In addition, while certain processes are shown, other suitable processes may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
    generating, by a device, a prompt for a large language model that returns a set of transactional milestones for a particular type of transactional workflow in an application, based on input from a user interface that indicates the particular type of transactional workflow;
    identifying, by the device, a set of monitored transactions in the application that match any of the set of transactional milestones;
    aggregating, by the device, observability data for the set of monitored transactions into a transactional workflow of the particular type; and
    providing, by the device, information regarding the transactional workflow for display by the user interface.

2. The method as in claim 1, wherein the observability data comprises metrics, events, logs, and traces regarding the application.

3. The method as in claim 1, wherein the prompt indicates an output format for the set of transactional milestones.

4. The method as in claim 1, wherein the input from the user interface comprises at least one of: voice data or text data.

5. The method as in claim 1, wherein the set of transactional milestones include endpoints of the application associated with those transactional milestones.

6. The method as in claim 5, wherein the device identifies the set of monitored transactions based on the endpoints of the application.

7. The method as in claim 1, wherein the transactional workflow is a transaction funnel.

8. The method as in claim 7, wherein the information regarding the transactional workflow indicates a count of users that performed each of the set of transactional milestones.

9. The method as in claim 1, further comprising:
    sending the prompt to the large language model via an application programming interface.

10. The method as in claim 1, wherein the set of monitored transactions in the application are monitored via instrumentation inserted into the application.

11. An apparatus, comprising:
    one or more network interfaces;
    a processor coupled to the one or more network interfaces and configured to execute one or more processes; and
    a memory configured to store a process that is executable by the processor, the process when executed configured to:
        generate a prompt for a large language model that returns a set of transactional milestones for a particular type of transactional workflow in an application, based on input from a user interface that indicates the particular type of transactional workflow;
        identify a set of monitored transactions in the application that match any of the set of transactional milestones;
        aggregate obtained observability data for the set of monitored transactions into a transactional workflow of the particular type; and provide information regarding the transactional workflow for display by the user interface.

12. The apparatus as in claim 11, wherein the obtained observability data comprises metrics, events, logs, and traces regarding the application.

13. The apparatus as in claim 11, wherein the prompt indicates an output format for the set of transactional milestones.

14. The apparatus as in claim 11, wherein the input from the user interface comprises at least one of: voice data or text data.

15. The apparatus as in claim 11, wherein the set of transactional milestones include endpoints of the application associated with those transactional milestones.

16. The apparatus as in claim 15, wherein the apparatus identifies the set of monitored transactions based on the endpoints of the application.

17. The apparatus as in claim 11, wherein the transactional workflow is a transaction funnel.

18. The apparatus as in claim 17, wherein the information regarding the transactional workflow indicates a count of users that performed each of the set of transactional milestones.

19. The apparatus as in claim 11, wherein the process when executed is further configured to:
send the prompt to the large language model via an application programming interface.

20. A tangible, non-transitory, computer-readable medium storing program instructions that cause a device to execute a process comprising:
generating, by a device, a prompt for a large language model that returns a set of transactional milestones for a particular type of transactional workflow in an application, based on input from a user interface that indicates the particular type of transactional workflow;
dentifying, by the device, a set of monitored transactions in the application that match any of the set of transactional milestones;
aggregating, by the device, observability data for the set of monitored transactions into a transactional workflow of the particular type; and
providing, by the device, information regarding the transactional workflow for display by the user interface.

* * * * *